US005519935A

United States Patent [19]

Lawruk et al.

[11] Patent Number: 5,519,935

[45] Date of Patent: May 28, 1996

[54] MACHINE FOR ATTACHING PREASSEMBLED CONNECTORS TO RIBBON CABLE

[75] Inventors: Stephen P. Lawruk, Middletown; Kerry J. Stakem, Hummelstown; James A. Hogan, Jr., Harrisburg, all of Pa.

[73] Assignee: The Whitaker Corporation, Wilmington, Del.

[21] Appl. No.: 367,564

[22] Filed: Jan. 3, 1995

[51] Int. Cl.$^{6}$ .............................. B23P 19/00; H01R 43/00

[52] U.S. Cl. ............................ 29/748; 29/33 M; 198/409

[58] Field of Search .............................. 29/747, 748, 749, 29/842, 857, DIG. 15, 33 M; 198/406, 409; 414/750

[56] References Cited

U.S. PATENT DOCUMENTS

| | | | |
|---|---|---|---|
| 4,566,164 | 1/1986 | Brown et al. | 29/33 M |
| 4,623,293 | 11/1986 | Brown et al. | 414/126 |
| 4,660,279 | 4/1987 | Szumierz et al. | 29/747 |
| 4,682,391 | 7/1987 | Hall, Jr. et al. | 29/33 M |
| 4,729,152 | 3/1988 | Hammond et al. | 29/749 X |
| 4,838,407 | 6/1989 | Komuro | 29/747 |
| 4,839,962 | 6/1989 | Long, Jr. | 29/749 |
| 4,870,752 | 10/1989 | Brown et al. | 29/866 |
| 4,903,403 | 2/1990 | Brown et al. | 29/861 |
| 5,074,038 | 12/1991 | Fath | 29/861 |

*Primary Examiner*—Peter Vo
*Assistant Examiner*—Khan V. Nguyen

[57] ABSTRACT

A machine and method for attaching a plurality of preassembled connectors to a length of ribbon cable. The machine has at least one separating module in which the connectors are disposed in a selected orientation. Each connector is separated into a cover member and a connector housing member within the respective module. The modules are indexed and transferred to a press where the connector is terminated on the length of ribbon cable. A preassembled connector is disposed in a lead module and is terminated on the first end of the length of ribbon cable. The ribbon cable, with the attached spaced apart connectors, is cut to a desired length and tested electrically.

6 Claims, 9 Drawing Sheets

MACHINE FOR ATTACHING PREASSEMBLED CONNECTORS TO RIBBON CABLE

FIELD OF THE INVENTION

The present invention relates to a machine and a method for attaching preassembled connectors to ribbon cable and, more particularly, to the opening of the connectors in each module, moving each module over the ribbon cable and terminating the connector on the cable to provide a plurality of connectors on a length of cable.

BACKGROUND ART

The applicant is aware of various apparatus and methods for attaching electrical connectors to ribbon cable as disclosed in the following:

| U.S. Pat. No. | Inventor(s) |
|---|---|
| 4,566,164 | Brown et al |
| 4,623,293 | Brown et al |
| 4,682,391 | Hall, Jr. et al |
| 4,839,962 | Long, Jr. |
| 4,870,752 | Brown et al |
| 4,903,403 | Brown et al |
| 5,074,038 | Fath |

In most of these references, the ribbon cable is fed through the preassembled connector in an opening between the cover and the connector housing of the connector. This restricts the length of the ribbon or requires extensive manipulation to string the connectors in the desired sequence. The preassembled connectors are not separated into the cover and connector housing members. U.S. Pat. No. 4,566,164 discloses a machine to separate the preassembled connector prior to attaching the connector onto the ribbon cable. However, separating the preassembled connector requires several components and operations in the machine. A shuttle receives the connector from the loading location and separates the connector. The separated connector is inserted into the press by the connector loading assembly and the press mates the cover and the connector housing with the ribbon cable between. The orientation of the connector with respect to the cover being above or below the ribbon cable is determined when the connector is disposed in the shuttle. A magazine loaded with connectors dispenses a connector into a trap with a gate and the connector is received in the shuttle in the selected, cover up or cover down, orientation. Thus, selection of orientation is prior to separation and the same shuttle may have a connector in either the cover up or cover down orientation.

The machines of the prior art are useful, however there is a need for more rapid assembly of connectors on the ribbon cable with better control of the assembly and reduced assembly costs. The machine of the present invention provides the improved assembly and, in addition, provides electrical testing of each connector when attached to the ribbon cable.

SUMMARY OF THE INVENTION

It is a primary object of the present invention to provide a machine and a method to attach preassembled connectors onto a ribbon cable in a rapid, relatively inexpensive manner.

It is a further object of the present invention to separate the preassembled connectors in a module and to advance the module to a component of the machine to terminate the connector on the ribbon cable without transferring the connector from the module.

It is yet another object of the present invention to have the connectors in one module in an orientation and to have connectors with an inverted orientation in another module so that the connectors may be attached to the ribbon cable in a selected orientation.

It is still another object of the present invention to provide a machine for attaching preassembled connectors onto a ribbon cable and to have the attached connectors electrically tested.

In accordance with the teachings of the present invention, there is disclosed a machine for attaching a plurality of preassembled connectors on a length of ribbon cable. The machine has at least two modules, a lead module and a least one separating module. Preferably, there are three separating modules adjacent to one another. Means are provided for disposing preassembled connectors, one at a time, into each of the modules. Means are provided for terminating the preassembled connector within the lead module onto a first end of the length of ribbon cable. Means are provided within the at least one separating module for opening the respective preassembled connector. Means are provided for advancing the at least one separating module laterally wherein the ribbon cable is received transversely in the opened connector in the advanced module. Means are provided for retracting the at least one separating module laterally. Means are provided for advancing the ribbon cable such that the connectors are attached to the ribbon cable spaced apart from one another, the at least one separating module being alternately advanced and retracted and the opened connector in the at least one separating module being attached, in the spaced apart manner, along the length of the ribbon cable. Means are provided for electrically testing each connector attached to the ribbon cable. Means are provided for cutting the ribbon cable having the connectors attached thereto.

In further accordance with the teachings of the present invention, there is disclosed a machine for attaching a plurality of connectors to a length of ribbon cable. The machine has at least two modules disposed adjacent to each other. One of the connectors is disposed in each of the modules at any time. The adjacent modules are simultaneously movable in a first direction and the reverse thereof. The modules are individually movable in a second direction and the reverse thereof, perpendicular to the first direction. A selected one of the modules may be moved to the ribbon cable and the connector within the selected module terminated thereon. The selected module may be returned to the position adjacent to the other modules.

A method for attaching a plurality of connectors on ribbon cable is also disclosed.

These and other objects of the present invention will become apparent from a reading of the following specification, taken in conjunction with the enclosed drawings.

DESCRIPTION OF THE PREFERRED EMBODIMENTS

Figure 1:
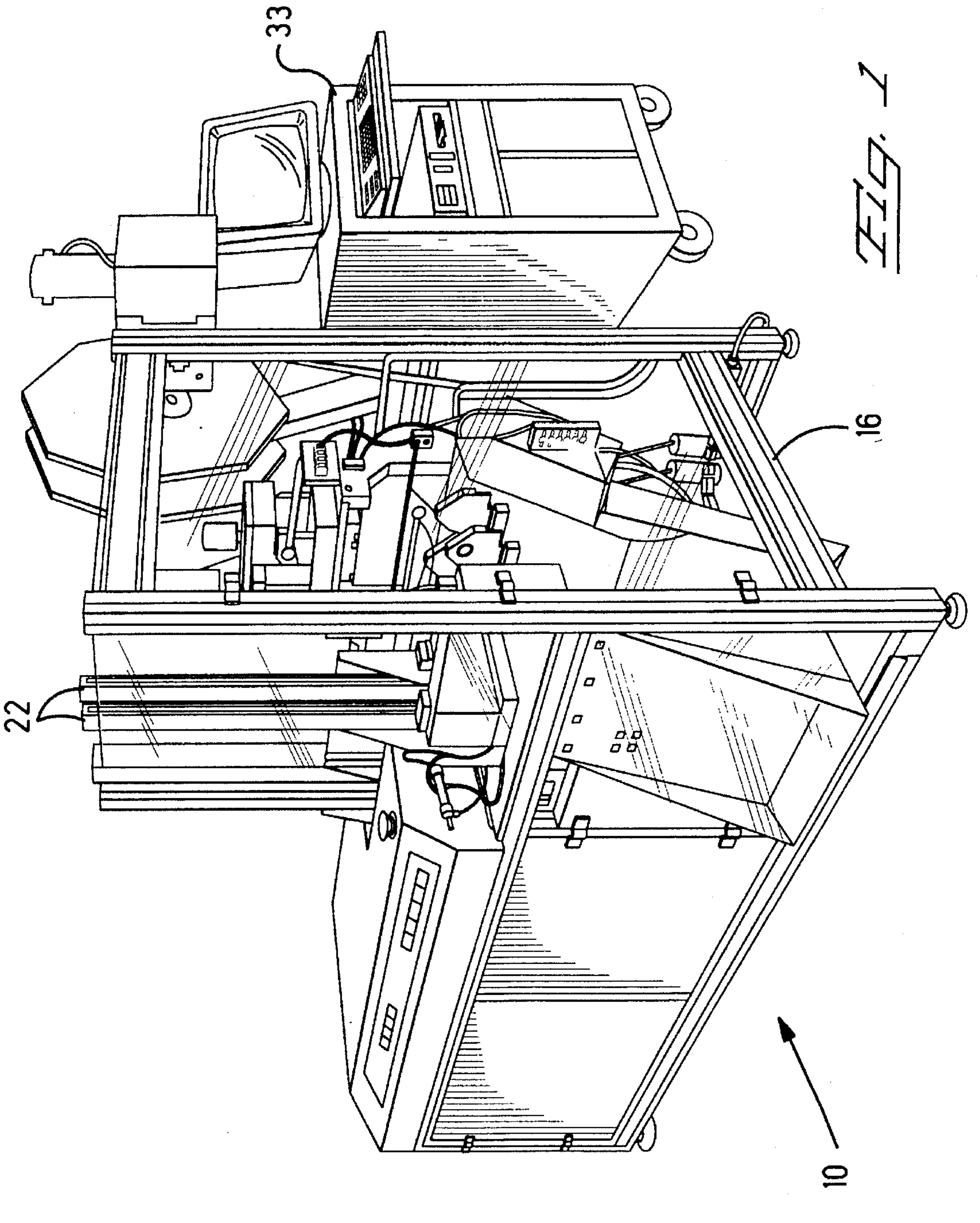
FIG. 1 is a perspective view of the machine of the present invention.
Figure 3:
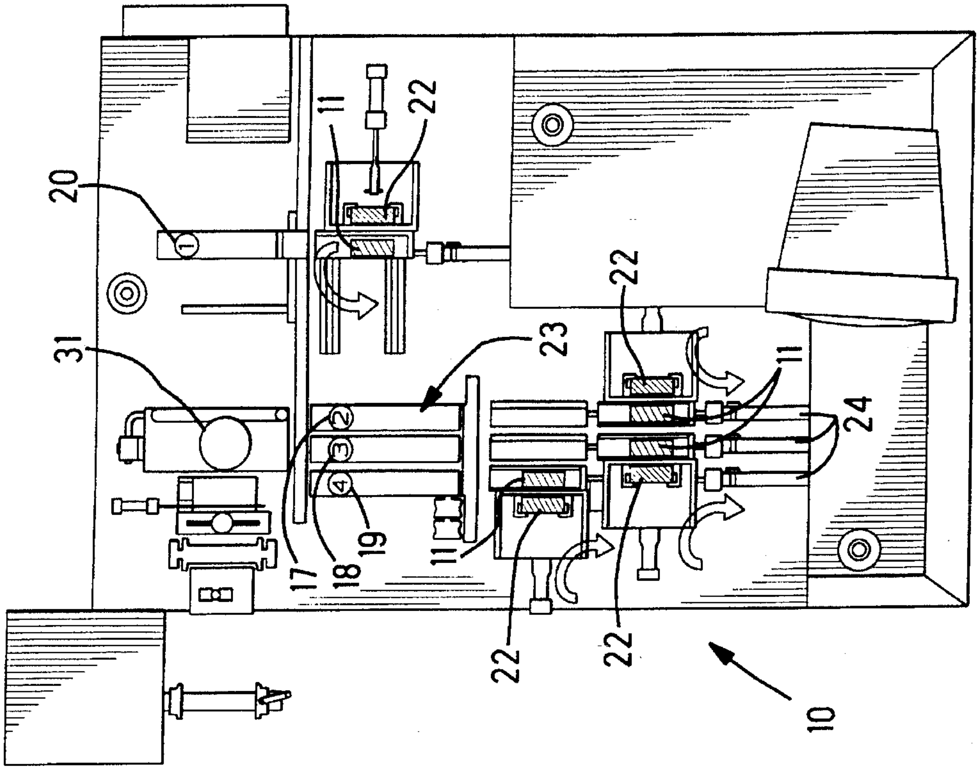
FIG. 3 is the view of FIG. 3 showing connectors being dispensed from magazines.
Figure 2:
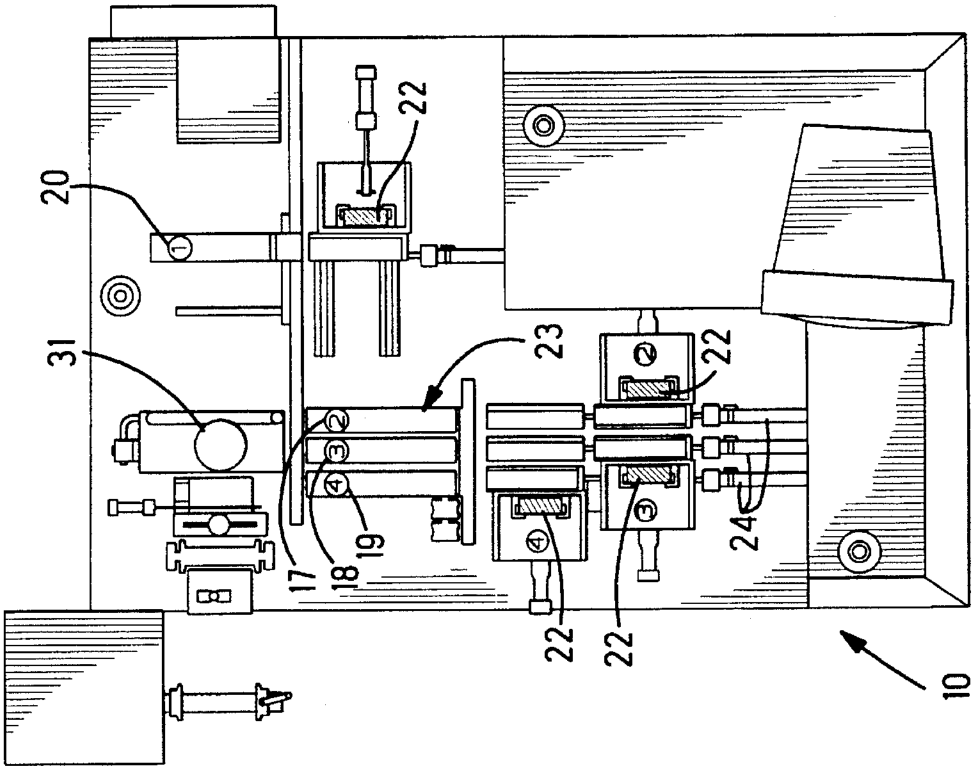
FIG. 2 is a top plan view of the machine of the present invention.
Figure 5:
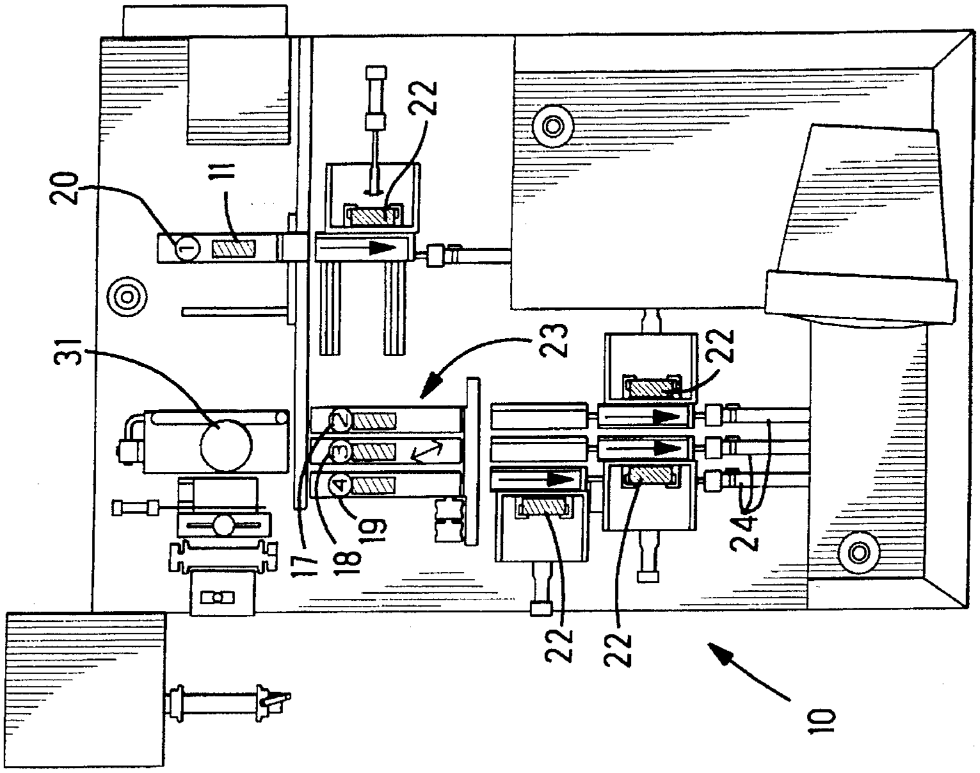
FIG. 5 is the view of FIG. 3 showing the separation of the connector within the respective modules.
Figure 4:
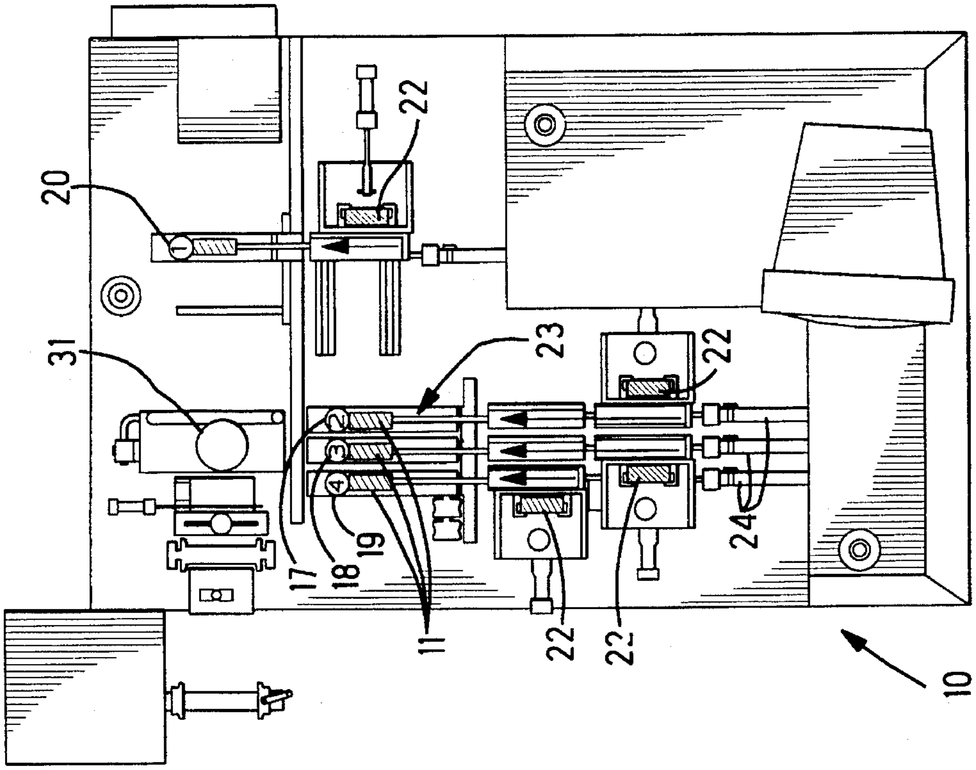
FIG. 4 is the view of FIG. 3 showing connectors being loaded into modules.
Figure 7:
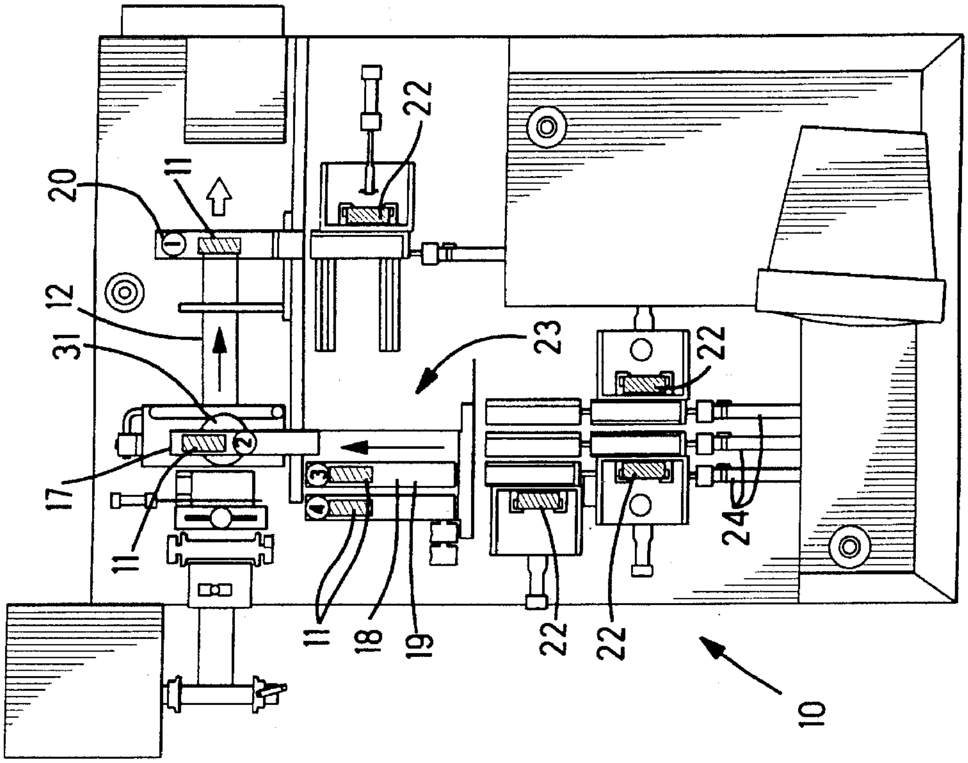
FIG. 7 is the view of FIG. 3 showing the ribbon cable advanced and the connector within a second module being terminated on the ribbon cable.
Figure 6:
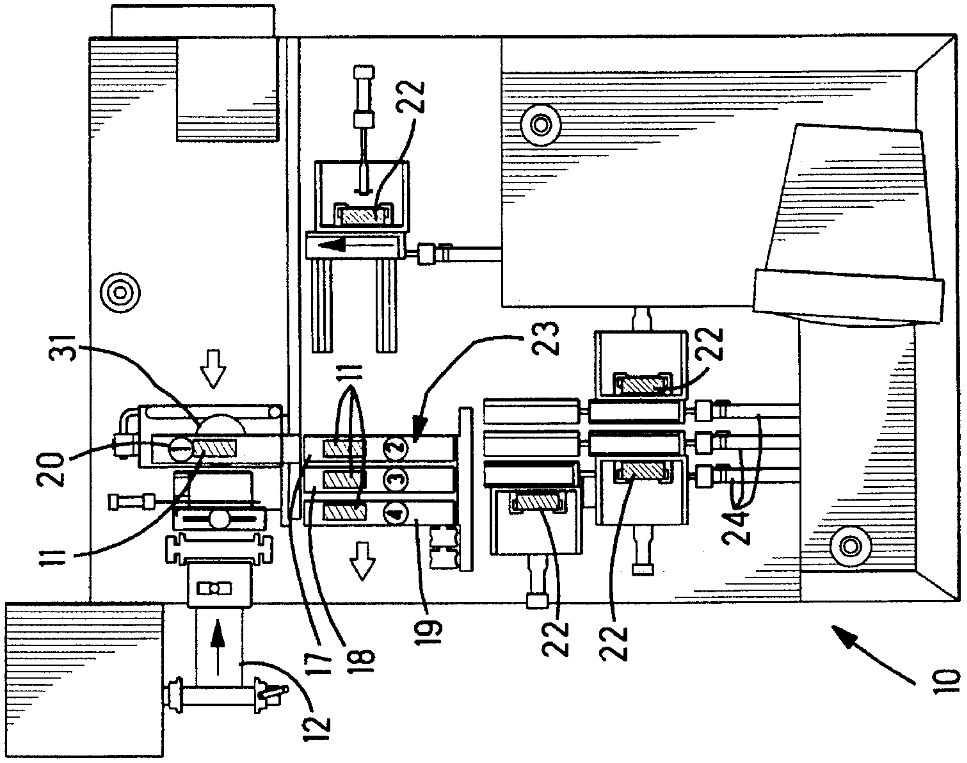
FIG. 6 is the view of FIG. 3 showing a connector being terminated on the first end of the ribbon cable.
Figure 9:
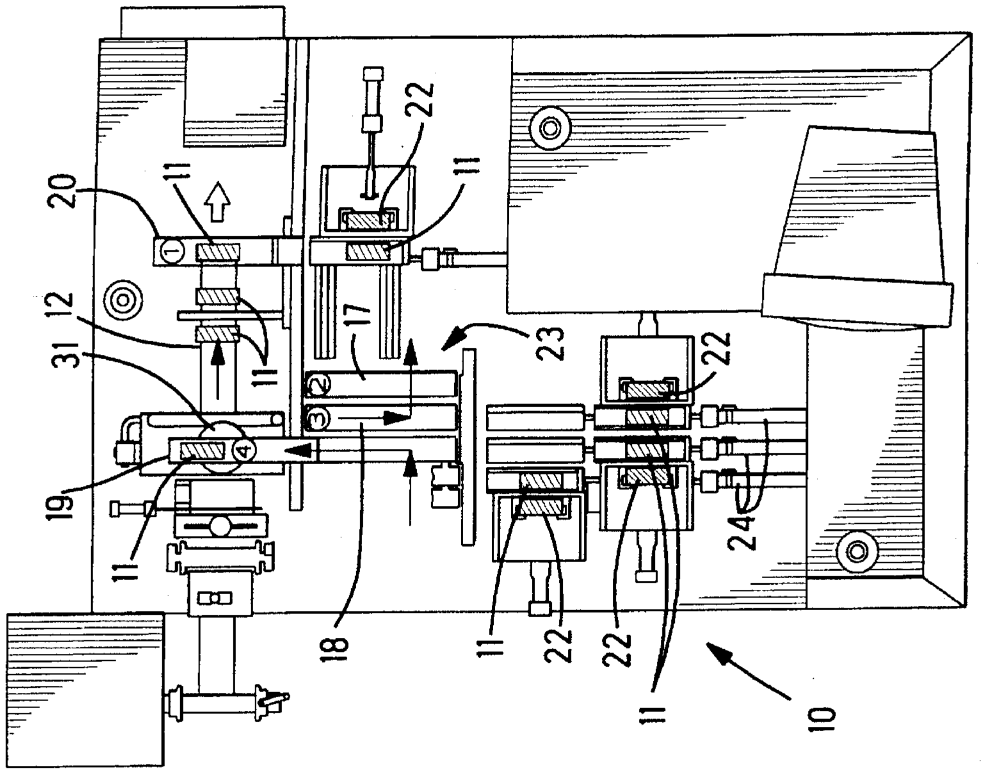
FIG. 9 is the view of FIG. 3 showing the third module retracted, the ribbon cable advanced and the connector within a fourth module being terminated on the ribbon cable.
Figure 8:
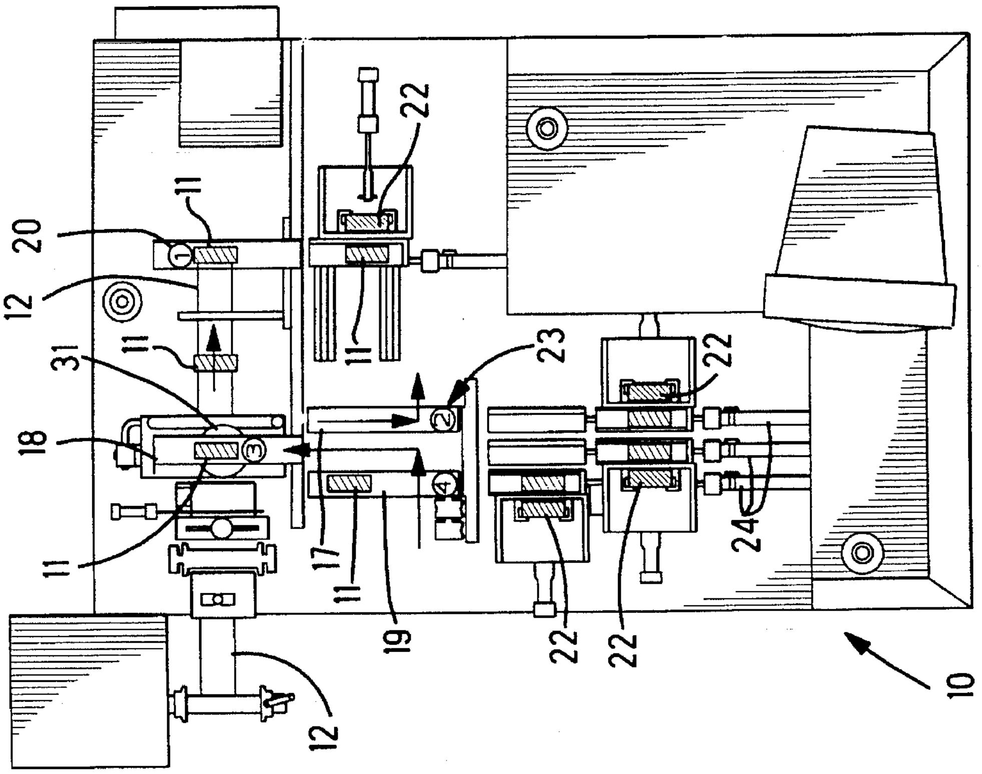
FIG. 8 is the view of FIG. 3 showing the second module retracted, the ribbon cable advanced and the connector within a third module being terminated on the ribbon cable.

The machine 10 of the present invention is an automated device to expedite the attachment of preassembled connectors 11 onto a ribbon cable 12 so as to attach spaced-apart connectors 11 on the length of ribbon cable 12. The preassembled connectors 11 each have a cover member 13 and a connector housing member 14 which are joined together as received from the supplier. Prior to attachment of each connector 11 onto the ribbon cable 12, the present machine 10 separates the individual connector 11 within a separate module as will be described.

Figure 10:
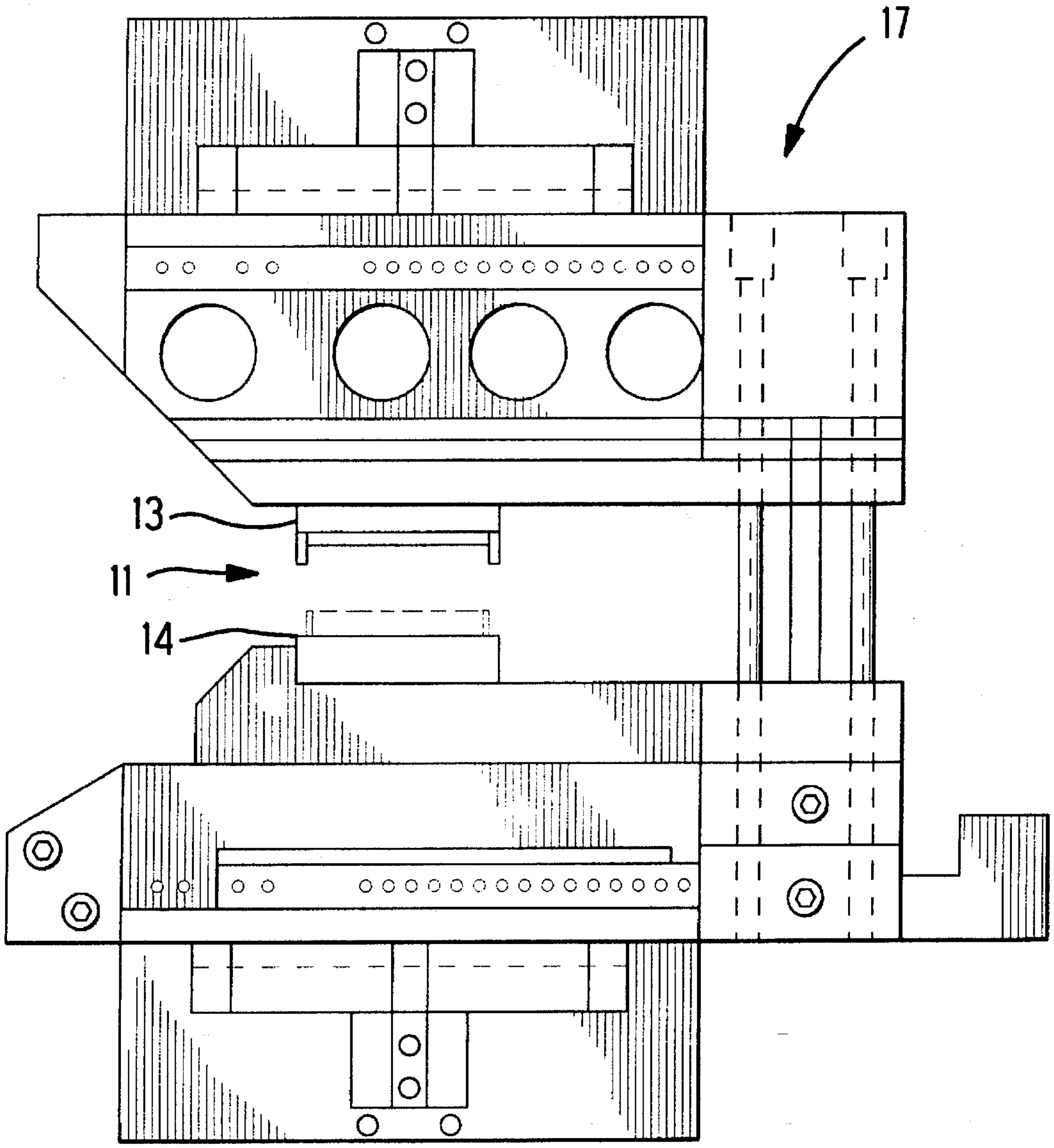
FIG. 10 is a side elevation view of a module containing a connector which is held by grippers on the module and the cover has been separated from the connector housing of the connector.
Figure 11:
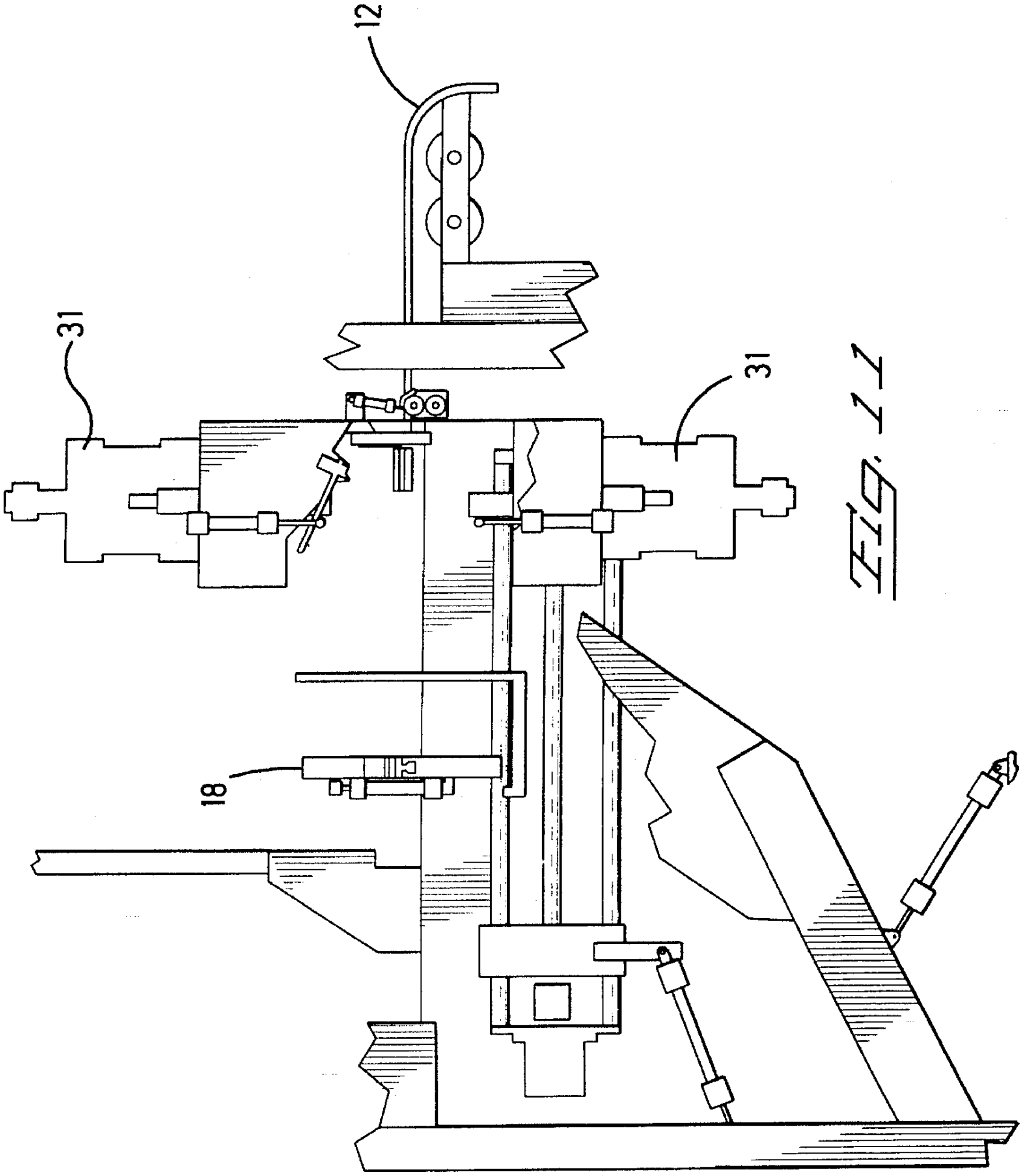
FIG. 11 is a partial side elevation view showing the open press and a module.

The machine 10 has a frame 16 to support the components of the machine 10 (FIG. 1). At least two modules and preferably four modules are mounted in the machine 10 as will be described. As shown in FIGS. 2–9, at least one module is provided and, in a preferred embodiment, three separating modules 17, 18, 19 are side-by-side with one another and a lead module 20 is disposed forwardly of the three modules 17, 18, 19. The lead module 20 is provided irrespective of the number of other modules. A separate load tower 22 is provided for each module 17, 18, 19 and 20. The preassembled connectors 11 are loaded horizontally into the respective load tower 22 with any one load tower 22 having all the connectors 11 is the same orientation, i.e. all the connectors 11 within the same load tower 22 have the covers 13 in one direction and the connector housings 14 in the opposite direction. As shown by the arrows in FIG. 3, the connectors 11 are dispensed, one at a time, from the respective load tower 22 and are placed so that, from a load tower 22, the cover 13 is either in an up or a down position, depending upon the orientation within the respective load tower 22. In this manner, any module fed by a particular load tower 22 always receives connectors in the same orientation. That is, all of the connectors dispensed to a particular module are either in an upright orientation with the cover up, or in an inverted orientation with the cover down. The preassembled connector 11 is dispensed from the respective load tower 22 onto a track 23. A ram 24 advances the connector 11 into a respective module 17, 18, 19, 20 and the length of the connector 11 is checked electrically. Within the respective module 17, 18, 19, there are at least one pair of opposed grippers 25 which hold the cover member 13 and connector housing member 14 of the connector 11. Each module 17, 18, 19 has an upper portion and a lower portion which are movable in a direction opposed to one another. The portions are moved apart so that the grippers 25 are moved apart, and in so moving, separate the cover member 13 from the connector housing member 14 of the respective connector 11 (FIG. 10). The module with the grippers 25 is the subject of copending application Ser. No. 08/367,562, pending, which is assigned to the same assignee.

Figure 12:
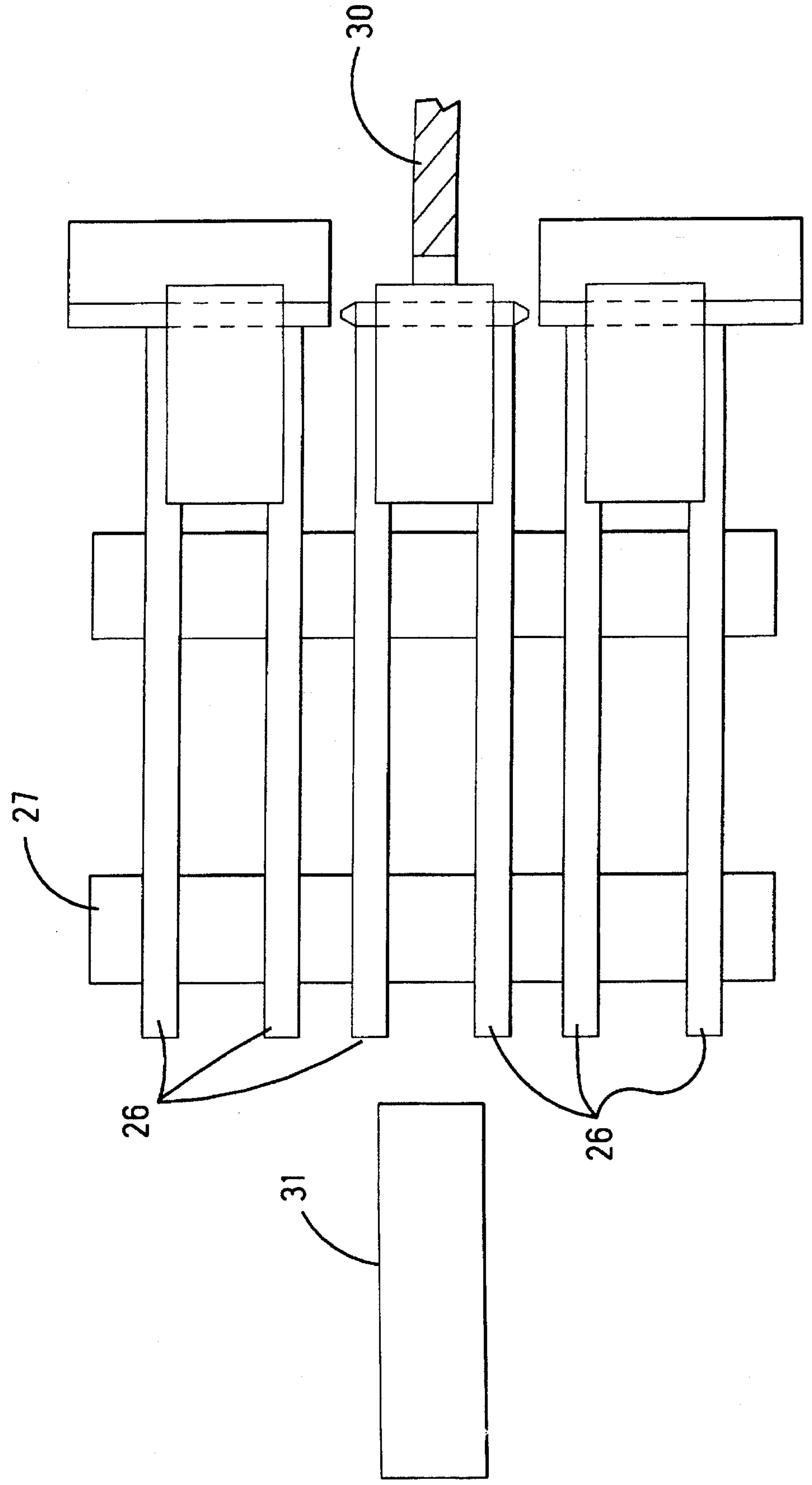
FIG. 12 is a top plan view of the modules on a track, which is slidably moved to dispose a selected module for advancement to the ribbon cable.
Figure 13:
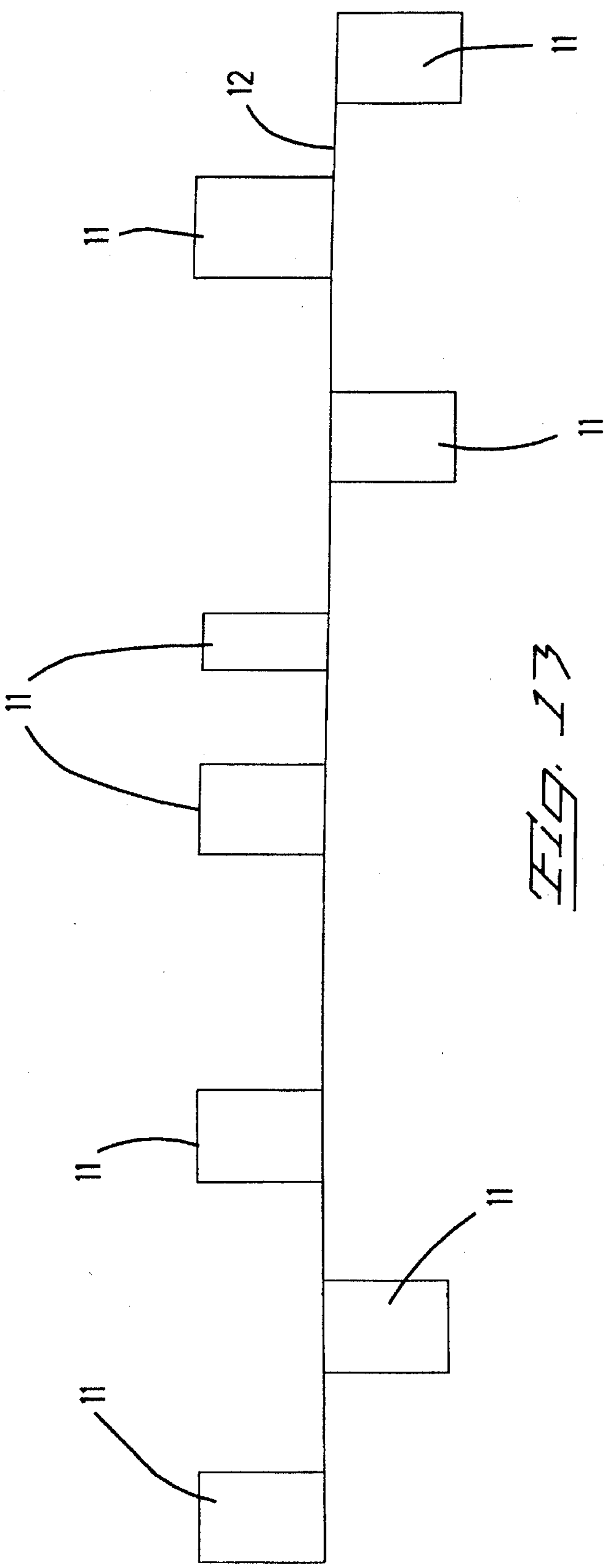
FIG. 13 is a diagram showing a ribbon cable with a plurality of connectors attached in which the orientation of the connectors is varied.

The side-by-side modules 17, 18, 19 are each mounted on a set of guides 26, the guides 26 being parallel to one another (FIG. 12). All the guides are on a plate 27 which is slidably movable in a direction perpendicular to the guides 26. A pusher/puller means 30 is disposed opposite one end of the guides 26 and the selected module, for example module 17 is placed in alignment with the pusher means 30. The pusher means 30 may be pneumatically, hydraulically, electrically or mechanically activated. The pusher/puller means 30 advances, or transfers, the selected module 17 to a position in a press 31 in which the ribbon cable 12 is received transversely between the separated cover member 13 and the connector housing member 14 of the connector 11. As previously indicated, depending upon the orientation of the connector 11 within a particular module 17, the cover member 13 may be oriented on the upper or the lower side of the ribbon cable 12. The selected module 17 is then pressed together such that the connector 11 is terminated on the ribbon cable 12. After the press 31 opens, The selected module 17 is moved out the press 31 and retracted by the pusher/puller means 30 to a position adjacent to the other modules 18, 19. The plate 27 slides to align the guide 26 with another selected module, or example module 18. The movement of the selected module to align with the pusher and to advance the selected module to the press 31, is identified as indexing. Concurrently, the ribbon cable 12 is advanced a desired distance. The selected module 18 is indexed as with module 17, transferred to the press 31 and the connector 11 is terminated on the ribbon cable 12 at a predetermined space from the previously terminated connector 11. In a similar manner, the selected module 18 is retracted, the ribbon cable 12 advanced, selected module 19 is indexed, transferred to the press 31, the connector terminated and selected module 19 retracted. The modules are refilled with preassembled connectors 11 and the process repeated. A computer 33 in the machine 10 is programmed to determine the orientation of the connector 11, the order of advancement and retraction of the selected modules and the length of advancement of the ribbon cable 12 so that the spacing and orientation of the connectors 11 attached to the ribbon cable 12 is controlled (FIG. 13). Additional connectors are attached. The ribbon cable 12 with the first connector attached is moved away from the press 31 to a distance determined by the size of the machine. If the length of the ribbon cable 12 exceeds this distance, the ribbon cable 12 with attached connectors 11 is retained in a trough until the desired number of connectors 11 are attached. When the desired number of connectors 11 have been attached to the ribbon cable 12, the ribbon cable 12 is sheared automatically by cutting means in the machine 10.

In a preferred embodiment, a separate lead module 20 is provided. The lead module 20 is disposed directly in the path of the ribbon cable 12 and is used to attach the initial connector 11 on the first end of the length of the ribbon cable 12. The lead module 20 is not adjacent to the other modules and is not indexed with the other modules. A separate load tower 22 is associated with the lead module 20 and the connectors are oriented to assure that the connector 11 is always oriented in the cover down position. It is preferred that the preassembled connector 10 is not separated in the lead module 20 as described above, but is retained with the unseparated configuration. The first end of the ribbon cable 12 is inserted between the cover member 13 and the connector housing member 14. The lead module 20, with the preassembled connector 21 loaded inside, is transferred to the press 31 (FIG. 6) and the connector 11 terminated on the initial end of the ribbon cable 12. The lead module 31 is then retracted to the initial position.

The computer 33 also controls electrical testing of the attached connectors and the completed length of ribbon cable 12. The connector on the initial end of the ribbon cable 12 which has been attached by the lead module 20 is checked for short circuits using a low voltage. If it fails the test, the cable ribbon 12 is cut,and the connector 11 attached to a short length of cable ribbon 12, is discarded into a separate bin. Similarly, the electrical low voltage short test and the continuity test are conducted on each connector 11 after attachment to the ribbon cable 12. The continuity test is conducted along the length of the ribbon cable 15 between the connector on the first end of the ribbon cable and each connector 11 after the connector 11 is terminated. The completed ribbon cable 12, with the desired number of connectors 11 attached, is checked for short circuits with high voltage across the length of the completed cable.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A machine for attaching a plurality of connectors on a length of ribbon cable, each of the connectors having a cover member which is preassembled to a connector housing member, the machine comprising:

a lead module and at least two separating modules;

means for dispensing the connectors individually into respective ones of the modules, the connectors in one of the separating modules being disposed in an upright orientation with the cover member above the connector housing member, and the connectors in the other of the separating modules being disposed in an inverted orientation with the connector housing member above the cover member;

means for terminating the connector within the lead module onto a first end of the length of ribbon cable;

means within each of the separating modules for separating the cover and connector housing members of the connector disposed therein;

means for advancing a selected one of the separating modules laterally to the ribbon cable, wherein the ribbon cable becomes disposed between the cover and connector housing members of an advanced connector;

means for terminating the advanced connector on the ribbon cable;

means for retracting the selected separating module laterally;

means for advancing the ribbon cable longitudinally such that the terminated connector may be spaced apart along the length of ribbon cable from a next to be terminated connector; and, means for cutting the ribbon cable having the connectors attached thereto;

wherein a plurality of the connectors may be terminated on the ribbon cable in spaced apart relationship with each of the connectors being in a selected one of the upright and inverted orientations.

2. The machine according to claim 1, wherein the means for advancing and the means for retracting the selected separating module includes a pusher/puller mechanism, and wherein the at least two separating modules are slidably mounted to permit alignment of the selected module with the pusher/puller mechanism.

3. The machine according to claim 1, wherein the means for separating comprises a pair of opposed grippers in each of the separating modules, the grippers of each pair being configured to hold a respective one of the cover and connector housing members and being operable for movement relatively apart to separate the members.

4. The machine according to claim 1, wherein each of the separating modules has an upper portion and a lower portion which are movable away from each other to permit reception of the connector therebetween, and toward each other to compress the connector and terminate the connector on the ribbon cable.

5. The machine according to claim 1, further comprising means for electrically testing the attachment of the connector to the ribbon cable to assure electrical continuity and absence of short circuits.

6. The machine according to claim 1, further comprising a computer operable for determining the orientation of the connectors in their respective modules for controlling a sequence of advancing and retracting the respective modules according to the number of connectors to be attached to the ribbon cable and for performing the electrical testing.

* * * * *